March 10, 1970 J. T. STURGES 3,499,323
AIRCRAFT SERVICE COMPUTER
Filed June 21, 1968 3 Sheets-Sheet 2
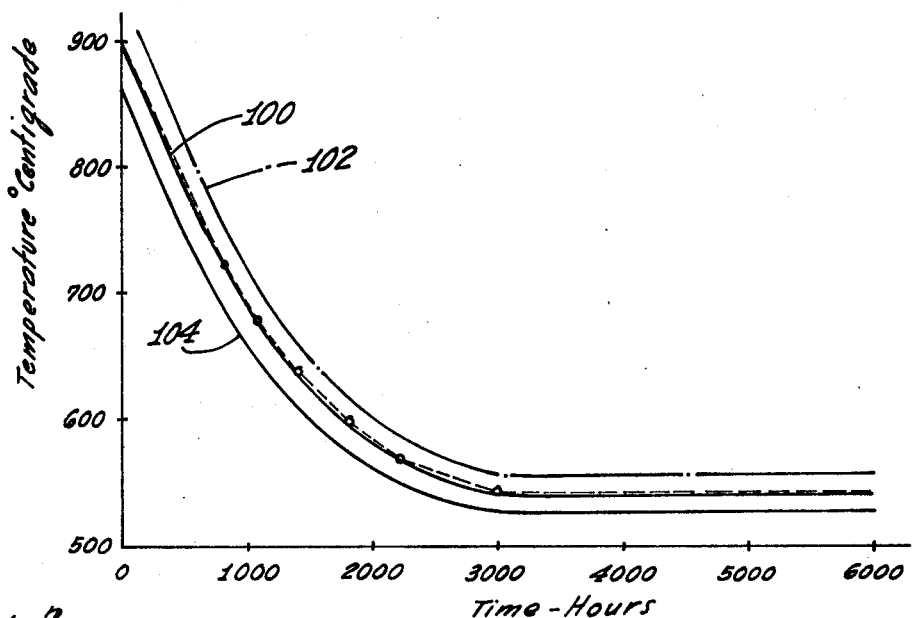
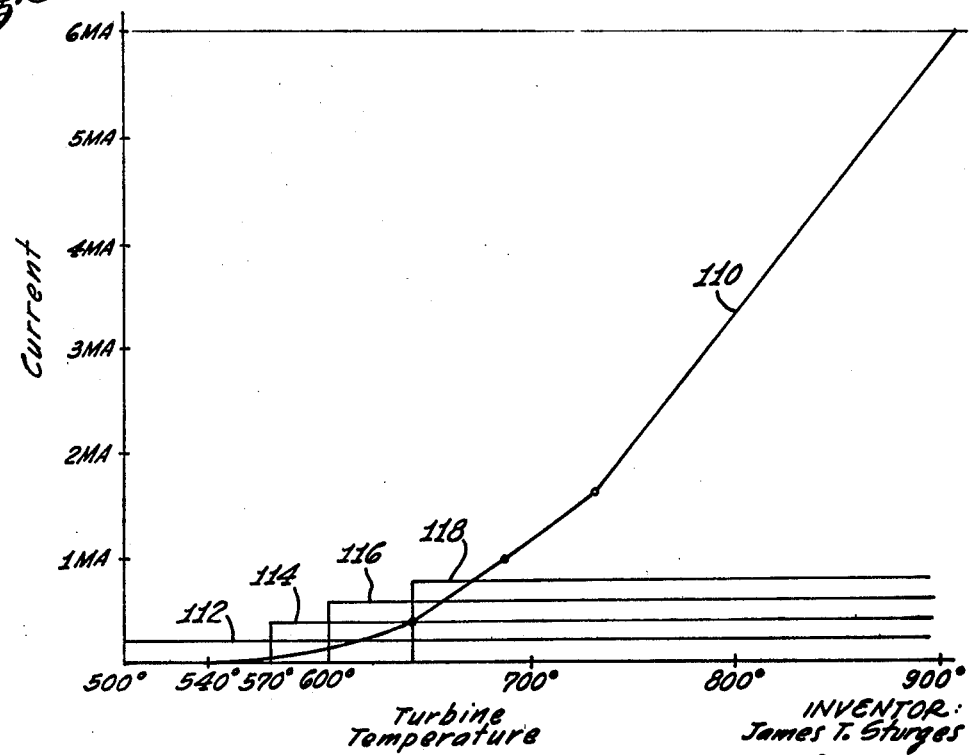
INVENTOR:
James T. Sturges
ATTORNEYS

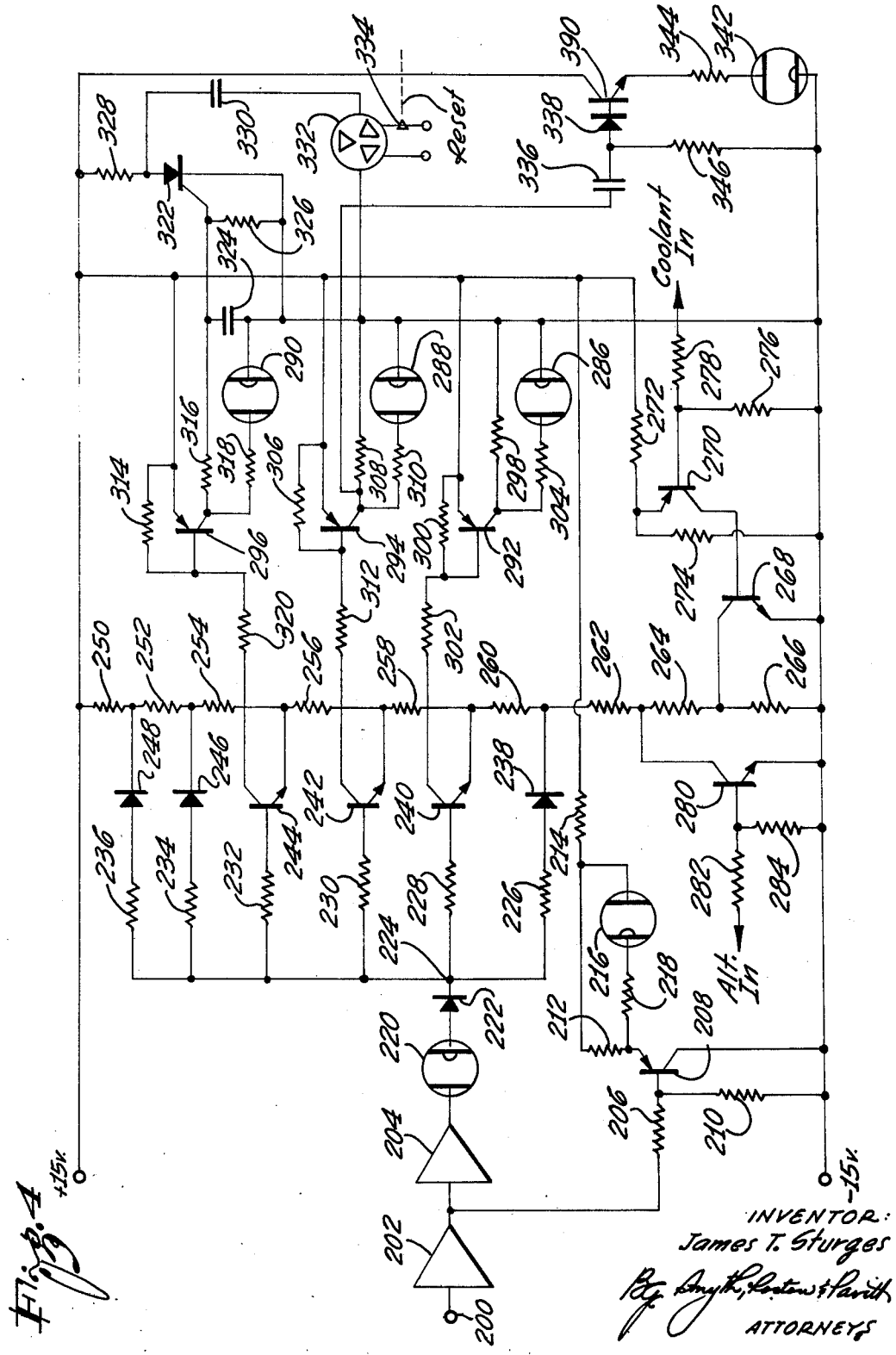

United States Patent Office 3,499,323
Patented Mar. 10, 1970

3,499,323
AIRCRAFT SERVICE COMPUTER
James T. Sturges, San Marcos, Calif., assignor to The Bissett-Berman Corporation, Santa Monica, Calif., a corporation of California
Filed June 21, 1968, Ser. No. 738,995
Int. Cl. G01l 3/26
U.S. Cl. 73—116                                22 Claims

ABSTRACT OF THE DISCLOSURE

The present invention relates to an aircraft service computer for monitoring the operating characteristics of an aircraft engine in accordance with the temperature of the engine and using an electrochemical storage member having at least a pair of electrodes and with the electrochemical storage member including active material for transfer between the electrodes and with a transfer of the active material occurring in accordance with the temperature conditions of the aircraft engine. Specifically, the invention includes applying a signal to the electrochemical storage member, which signal has a characteristic in accordance with the time-temperature operating characteristics of the aircraft engine. The invention also includes the use of a plurality of electrochemical storage elements for monitoring the operating characteristics of the aircraft engine by dividing the temperature of the engine into a plurality of temperature bands and with the electrochemical storage elements receiving signals in accordance with temperatures above predetermined values, which values represent the minimum temperature in each band. The means for driving the individual electrochemical storage members may be part of a function generator, which function generator also derives the signal representing the time-temperature operating characteristic of the aircraft engine. Other aspects of the invention include varying the level of the signal representing the time-temperature operating characteristics in accordance with conditions such as the altitude of the aircraft or the flow of a coolant within the engine cooling system. The invention also includes the use of an additional electrochemical storage member which is designed to receive a signal each time the temperature of the aircraft engine exceeds a certain value, which signal transfers a predetermined quantity of active material in an electrochemical cell. The use of such an electrochemical storage member provides for an event counter so as to count the number of times the temperature exceeds a predetermined value.

---

The present invention relates to an aircraft service computer. Specifically, the invention has the greatest application in the monitoring of a jet engine as to its temperature conditions so as to give an evaluation to the operator of the aircraft when would be the proper time to provide maintenance for the aircraft engine. The older systems of aircraft maintenance provided for an overhauling of the aircraft engine at prescribed times. This maintenance of the engine at prescribed times results in an overhaul of the engine when it is not necessary or it may result in not overhauling the engine when it is necessary. The present invention monitors the condition of the aircraft engine and stores a variety of types of information so that the operator may accurately determine the proper maintenance procedures.

For example, the present invention may be used to monitor the operating conditions of a turbo-jet engine so as to determine the proper maintenance times. The maintenance procedures now used with a turbo-jet engine provide for an overhaul as to the so-called "hot section" portion of the engine. The hot section portion of the engine extends from the high-pressure compressor through the diffuser case, burner chamber, power turbine and exhaust thrust reverser sections. It is known that a direct relationship exists between the engine exhaust gas temperature and the hot section deterioration. In a typical engine, the rate of deterioration doubles for each 18° C. above normal ratings. The result when plotted against time may be expressed in degree hours and is known as the "stress-rupture curve."

The present invention monitors the temperature of the engine and accumulates information corresponding to the stress-rupture curve by the transfer of an active material within an electrochemical storage member. The present invention, therefore, provides for a storage of this information which may then be read out on demand by the ground crew. The stress-rupture curve may also be considered to correspond to the time-temperature operating characteristic of the aircraft engine, which operating characteristic defines the particular length of time that the engine can run safely for each particular temperature, which length of time varies in accordance with the temperature.

The aircraft service computer of the present invention not only monitors the time-temperature characteristics of the engine but also it divides the temperature condition of the engine into discrete bands which are also monitored using electrochemical storage elements. The decision to perform elementary hot section inspection to replace key components or remove the engine immediately for overhaul is greatly aided by a knowledge of the time-temperature exposure in each temperature band.

The present invention also includes the use of an electrochemical storage element which operates as an event counter so that each time the temperature of the aircraft engine exceeds a particular value, the electrochemical storage member receives a transfer of a particular charge of active material. The information stored by the event counter when correlated with the other stored temperature information may be used to provide the average length of time that the engine is exposed to a particular temperature condition. The present invention may also include a gross over-temperature warning device so as to alert the ground crew to a need for prompt maintenance action. The gross over-temperature warning device has been found to be necessary since it is difficult if not impossible for a flight engineer to constantly monitor the temperature conditions of the aircraft engine so as to always note when an engine is exposed to a gross over-temperature condition.

The present invention, therefore, provides for a complete monitoring of the operation of an aircraft engine and specifically has the following particular monitoring capabilities. The aircraft service computer of the present invention detects and accumulates in degree minutes of exposure all engine over-temperatures at or above each of a plurality of critical temperature bands for which maintenance action is specified in the engine technical order. As a typical detection point for a common turbo-jet engine, the temperature bands may have the following minimum temperature levels: 570° C., 600° C., and 640° C. The actual accumulation of degree minutes is provided by electrochemical storage members which include active material for transfer between electrodes in the electrochemical storage members. Each electrochemical storage member provides for a transfer of the active material in accordance with the reception of a signal relating to the operation of the aircraft engine within a particular temperature band.

The present invention also detects and accumulates the stress-rupture information of the hot section portion of the engine which as described above, may be considered to be the time-temperature operating characteristic of the engine. The time-temperature operating characteristic as plotted is a nonlinear curve and the actual shape of the curve may be adjusted to conform to a particular engine. The actual accumulation of the time-temperature information is provided in an electrochemical storage member by the transfer of active material and the signal which is applied to the electrochemical storage member may be composed of a plurality of straight lines each having a different slope, which straight lines simulate the curve of the time-temperature operating characteristic. The various straight line portions which simulate the time-temperature operating characteristic may be provided by a function generator and the function generator may use the same detection system to provide the crossover points for the various straight lines as is used to provide for the storage of information in the various temperature bands.

One additional factor which may be used with the accumulation of information relating to the time-temperature operating characteristic is a shifting of the level of the signal applied to the electrochemical storage member in accordance with the change in the time-temperature operating characteristic with various conditions, which conditions affect the sensitivity of the engine to temperature. Specifically, the sensitivity of the engine to temperature is affected by conditions such as altitude, ram air pressure, compressor discharge pressure, etc. This shift in the level of the signal may be accomplished automatically by a detection of one or more of the above conditions.

The present invention may also include an event counter which also uses an electrochemical storage member so as to count the number of over-temperature excursions at or above a preset temperature level. The use of the event counter allows both the number of over-temperature events and the average duration of over-temperature to be determined by correlating the event counter with the monitoring of the various temperature bands.

In order to provide an indication of the actual operating time of the aircraft engine, an engine hour monitor is used so as to detect and accumulate the true engine elapsed operating time since the last maintenance. However, in order to provide for a true monitoring of elapsed operating time, the present invention provides that the engine hour monitor only operates when the temperature condition is above a minimum operating temperature so as to verify the engine operation.

As a preventive measure so that the operator of the aircraft is warned when the engine exceeds a gross over-temperature value, the present invention includes some sort of a warning device such as a warning flag which trips when the engine registers a gross over-temperature.

All of the various storage functions as indicated above are accomplished using electrochemical storage members so that the monitoring is accomplished with no moving parts and with a minimum size and weight. Prior art systems which have provided for a monitoring of temperature conditions have been complicated and bulky and have used mechanical techniques with moving parts. The present invention, however, provides for a very accurate aircraft service computer which is relatively small in size and light in weight, both of which features are important considerations in the design of any equipment to be installed in aircraft. A clearer understanding of the invention will be had with reference to the following description and drawings wherein:

FIGURE 2 is a series of curves illustrating the time-temperature operating characteristics of an aircraft engine and how the present invention simulates that operating characteristic and provides a shift in the level of that operating characteristic;

FIGURE 3 is a series of curves illustrating the signals which are applied to the various electrochemical storage elements of FIGURE 1; and FIGURE 4 is a schematic of a particular aircraft service computer constructed in accordance with the teachings of the present invention.

Figure 1:
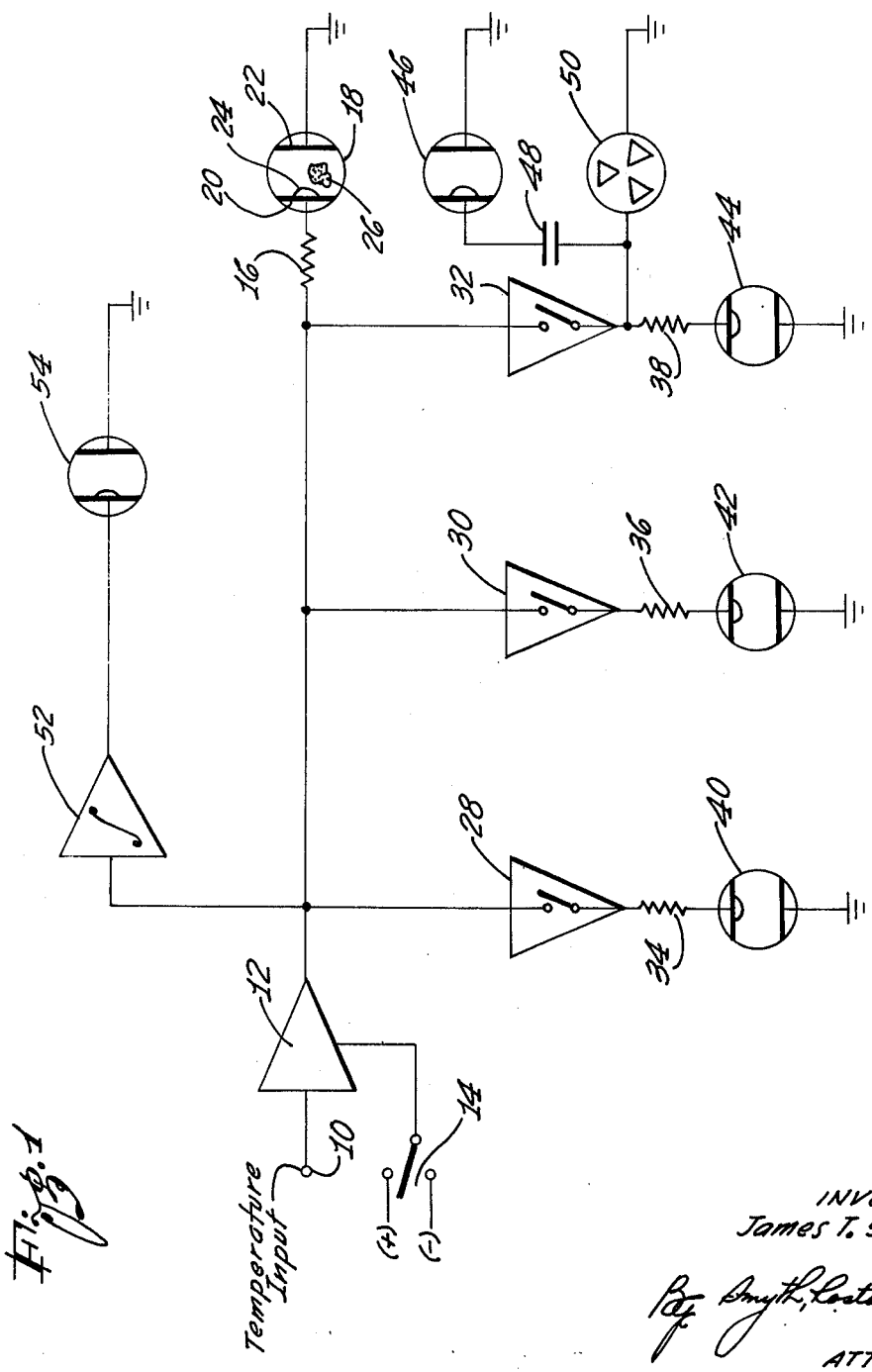
FIGURE 1 illustrates a block diagram of an aircraft service computer constructed in accordance with the teachings of the present invention.

In FIGURE 1, an input signal may be applied to the aircraft service computer of the present invention through an input point such as a terminal 10. The input signal may be a thermocouple input signal which monitors the engine exhaust gas temperature of an aircraft engine such as a jet engine. The input signal is applied to an amplifier 12, which amplifier, in addition to amplifying the temperature input signal, may also receive additional signals so as to modify the temperature input signal. For example, a signal may be applied to the amplifier 12 so as to shift the level of the temperature input signal either in a plus or in a minus direction, as shown by the switch 14, which shifting would be in accordance with various conditions which affect the sensitivity of the aircraft engine to temperature. For example, as indicated above, the shift may be accomplished in accordance with the monitoring of conditions such as altitude, ram air pressure, compressor discharge pressure, etc.

The output from the amplifier 12 is applied to a plurality of monitoring devices. For example, the output from the amplifier 12 may be applied through a resistor 16, which resistor controls the level of the output signal, to an electrochemical storage member 18. The electrochemical storage member 18 includes at least a pair of electrodes 20 and 22 and also includes active material 24 for transfer between the electrodes 20 and 22. In addition, an electrolyte 26 is included in the electrochemical storage member so as to facilitate the transfer of the active material.

The electrochemical storage member 18 and all other electrochemical storage members described with reference to the present invention may generally be of the type disclosed in application Ser. No. 519,634 filed Jan. 10, 1966, in the name of Martin Mintz and assigned to the assignee of the instant application. Upon the reception of a signal by the electrochemical storage member 18, active material 24 is transferred from electrode 20 to electrode 22. The re-transfer of the active material from electrode 22 back to electrode 20 at a later time may be measured so as to determine the total time that the engine is operated.

In addition to the elapsed time which is monitored by the electrochemical storage member 18, the output signal from the amplifier 12 may also be applied to a plurality of electronic switches 28, 30 and 32. Each switch is set to detect and close upon the reception of a particular level of signal from the amplifier 12, which level of signal represents a particular temperature condition in the aircraft engine. For example, the levels for the switches 28, 30 and 32 may be set to be 570° C., 600° C., and 640° C. The output from each of the switches 28, 30 and 32 is applied through resistors 34, 36 and 38 to electrochemical storage members 40, 42 and 44. Each electrochemical storage member may be of the type described above as shown in copending application Ser. No. 519,634.

The present invention may also include an event counter so as to determine each time the temperature of the engine exceeds a predetermined temperature. This event counter may be provided by an electrochemical storage member 46 and a capacitor 48. When the detector switch 32 detects a signal from amplifier 12, which signal represents a temperature condition exceeding 640° C., the switch 32 closes, thereby providing for a current flow through the capacitor 48 and through the electrochemical storage member 46. The actual active material transferred in the electrochemical storage member 46 depends upon the charging time for the capacitor 48, but once the capacitor 48 is fully charged, no more active material may be transferred in the electrochemical storage member 46. Therefore, each time the switch 32 closes, a particular charge of active material is transferred within the electrochemical storage member 46, thereby providing for an event counter. It is to be appreciated that additional event counters may be associated with switches 28 and 30 if it is so desired.

Associated with the event counter and the detection of an engine condition exceeding 640° C. is a gross over-temperature flag 50. The gross over-temperature flag 50 is set each time the temperature exceeds 640° C., which condition is detected by the detector switch 32. The gross over-temperature flag, therefore, provides a visual indication to the operator of the aircraft. The gross over-temperature flag 50 may be of a known type which remains set until physically reset by the operator of the aircraft and this physical reset may be prohibited until the engine is examined for damage.

As a final portion to the aircraft service computer of the present invention shown in FIGURE 1, a monitoring of the time-temperature operating characteristic of the aircraft engine may be provided through the use of a function generator 52 and electrochemical storage member 54. The output signal from the amplifier 12 is applied to the function generator 52 and the function generator 52 provides an output signal in accordance with the time-temperature operating characteristic of the aircraft engine. This output signal is then applied to the electrochemical storage member 54 to provide a transfer of active material within the storage member 54, as described above. The time-temperature operating characteristic is determined by the changes in the recommended operating time of the aircraft engine in accordance with changes in temperature.

A particular example of a time-temperature operating characteristic for an aircraft engine may be seen with reference to FIGURE 2. FIGURE 2 is a plot of temperature in centigrade versus time in hours and the plot is designated as a curve 100. As can be seen, as the temperature increases, the time in hours that the engine would operate before maintenance is required is rapidly reduced as the temperature increases. In order to simulate the time-temperature operating characteristic of the present invention, the function generator 52 shown in FIGURE 1 actually breaks the time-temperature curve into a plurality of segments and then applies straight line portions which simulate the curve 100. For example, the curve 100 is segmented over the following temperature bands: 540° C. and below; 540°–570° C.; 570°–600° C.; 600°–640° C.; 640°–680° C.; 680°–720° C., and 720° and above. It will be noted that to some degree the temperature bands corresponds to the same temperature bands monitored by electrochemical storage members 40, 42 and 44 in FIGURE 1 and the detection may be shared in a manner to be described with reference to a particular example of the invention so that portions of the function generator 52 may be used in conjunction with the switch detectors 28, 30 and 32 and simplify the structure of the present invention.

As explained with reference to FIGURE 1, the level of the output signal from the amplifier 12 may be shifted in either a positive or a negative direction by a switch 14 so as to shift the time-temperature operating characteristic in accordance with factors which change the sensitivity of the aircraft engine to temperature. These shifts are shown by curves 102 and 104 which parallel the time-temperature operating curve 100. It can be seen, therefore, that for various conditions the curve 100 may be shifted either up or down. For example, the sensitivity of the aircraft engine to temperature when the airplane is at a high altitude is increased so that actually the operating time is lower for the same temperature at a lower altitude. For example, when the aircraft is above a certain altitude, the switch 14 may be operated so that a signal such as curve 104 is to be produced. The specific operation of this shifting will be explained in greater detail at a later time with reference to a particular example of the invention. The curve may be shifted up, as shown by curve 102, when favorable conditions occur.

FIGURE 3 illustrates a series of curves which indicate the signals which are applied to the various electrochemical storage members shown in FIGURE 1. For example, the current applied to the electrochemical storage members is plotted against the temperature of the aircraft engine. Curve 110, which is formed from a series of straight lines, is applied to electrochemical storage member 54 shown in FIGURE 1. The signal 110 applied to electrochemical storage member 54, of course, represents the time-temperature operating characteristic and, as can be seen, for increases in temperature, the signal applied to the electrochemical storage member 54 is increased greatly. This signal 110 may be shifted up or down in accordance with the operation of the switch 14 shown in FIGURE 1.

A signal represented by the curve 112 is applied to the electrochemical storage member 18 and, as can be seen, this signal is present for all times that the engine is being operated. Signals which are applied to the electrochemical storage members 40, 42 and 44 are represented by curves 114, 116 and 118. It can be seen in FIGURE 3 that these signals appear as soon as the temperature condition is above a particular predetermined value. Actually, all of the signals applied to the various electrochemical storage members with the exception of electrochemical storage member 54 may have the same current value but, for purposes of clarity, in FIGURE 3 the current levels are shown to be different.

The electrochemical storage member 54 has differing current levels so that the electrochemical storage member 54 accumulates a transfer of active material in accordance with a specific non-linear function which relates to the time-temperature operating characteristic of the aircraft engine. FIGURE 3 does not illustrate the signal which would be applied to electrochemical storage member 46 which serves as an event counter, but this signal would merely be a pulse signal each time the aircraft service computer detects the presence of a signal representing a temperature exceeding a particular value which, as shown in FIGURE 1, is 640° C.

It may, therefore, be seen that the aircraft service computer of the present invention provides for the monitoring of many useful functions and does so in a simple, reliable way using small and lightweight equipment. A specific example of a particular aircraft service computer which is shown in detail may be seen with reference to FIGURE 4. In FIGURE 4, the input signal representing the temperature of the aircraft engine is applied to the aircraft service computer through a terminal 200. The input signal then passes through an amplifier 202 which raises the level of the input signal.

The output from the amplifier 202 is applied to a second amplifier 204 and is also applied through a resistor 206 to the base of a transistor 208. The base of the transistor is also biased from a source of negative potential through a resistor 210. The emitter of the transistor 208 is connected directly to the source of negative potential and the collector of the transistor 208 is connected to a source of positive potential through resistors 212 and 214. An electrochemical storage member 216 and a resistor 218 are in series and the resistor 218 and electrochemical storage member 216 are in parallel across the resistor 212.

When the signal from the amplifier 202 is sufficiently high and, in a particular example, high enough to represent an engine temperature of at least 200° C., the transistor 208 is turned on so as to conduct, at which time a current passes through the electrochemical storage member 216, thereby providing for a transfer of active material in the electrochemical storage member. The use of an input signal to the base of the transistor 208 which represents a temperature of at least 200° C. insures that the engine is actually being operated. The electrochemical storage member 216 thereby represents the total elapsed time of the operation of the aircraft engine.

The output from the amplifier 204 is applied through an electrochemical storage member 220 and a diode 222 to a terminal point 224. Connected to the terminal point 224 are a series of resistors 226 through 236, which resistors control the level of the signal coupled through the electrochemical storage member 220. The actual passage of current through the individual ones of the resistors 226 through 236 and therefore through the electrochemical storage member 220 is determined by diode 238, transistors 240, 242 and 244, and diodes 246 and 248. The base emitter portions of the transistors 240, 242 and 244 actually serve the same function as the diodes 238, 246 and 248.

The bias on the diodes and the base emitter portions of the transistors 240, 242 and 244 is determined by a voltage divider network including resistors 250 through 266. As can be seen, this chain of resistors is situated between a source of positive potential and a source of negative potential and between each junction in the chain a different voltage level is set so as to back bias the diodes and transistors. When the level of the signal from the amplifier 204 which appears at the junction point 224 rises, successive ones of the diodes and transistors conduct so that a current flows through the electrochemical storage member 220. For example, the voltage level between the resistors 260 and 262 is normally set so that a signal from the amplifier 204 representing a temperature condition of 540° C. is necessary before the diode 238 allows current to flow through electrochemical storage member 220. The other temperature conditions are: 570° C. before the transistor 240 allows current to flow; 600° C. before the transistor 242 allows current to flow; 640° C. before the transistor 244 allows current to flow; and temperatures of 680° C. and 720° C. before diodes 246 and 248 allow current to flow through the electrochemical storage member 220.

It can be seen, therefore, that each diode and portion of transistor provides for various currents to flow, which currents have a slope in accordance with the value of resistors 226 through 126. The combination of these currents simulates the time-temperature operating characteristic of the aircraft engine so that the active material transferred within the electrochemical storage member 220 represents the time-temperature operating characteristic, specifically the time-temperature operating characteristic 100 shown in FIGURE 2.

In order to provide for a shifting of the time-temperature operating characteristic as shown by curves 102 and 104 in FIGURE 2, the resistors 264 and 266 may be switched in or out of the circuit so as to shift up or down the various bias points on the diodes and transistors. This has the effect, for example, of either lowering or raising the equivalent signal which is necessary before the diodes or transistors allow current to flow. For example, the combination of the transistors 268 and 270 with biasing resistors 272, 274, 276 and 278 normally maintain the resistor 266 shorted out. Therefore, the transistor 268 is normally turned on by the output signal from the transistor 270. Upon the reception of a signal coupled through the resistor 276, which signal may represent a condition such as the circulation of coolant in the cooling system of the aircraft engine, the transistor 268 is turned off so that the resistor 266 is now in the biasing circuit. When a condition occurs in the aircraft engine when coolant is circulated in the cooling system, this has the effect of lengthening the operating time of the engine for a given temperature condition. Therefore, it is desirable to shift the level of the bias upward so that it requires a higher temperature to provide current flow through the electrochemical storage element 220.

The opposite condition may occur in a situation where the aircraft is taken to high altitudes. For example, the transistor 280 is normally turned off. An input signal, such as a signal which represents an altitude above a particular altitude, is applied to the base of the transistor through a resistor 282 and across a resistor 284. When the signal has a particular level, the transistor 280 is turned on, thereby shorting out both resistors 264 and 266. This has the effect of shifting the biasing for the diodes and transistors described above downward so that the current which flows through the electrochemical storage member 220 occurs at lower temperatures than is normal. It is to be appreciated that the input signals representing coolant circulated to the engine or altitude of the aircraft are representative only in that other conditions may be monitored so as to shift the biasing up or down and thereby vary the level of the signal applied to the electrochemical storage member 220 in accordance with these conditions.

In addition to the storage of information representing the time-temperature operating characteristic in an aircraft engine, the present invention also includes the use of electrochemical storage members such as electrochemical storage members 286, 288 and 290 to store information representing various temperature bands. For example, the flow of current through the electrochemical storage members 286, 288 and 290 is controlled by transistors 292, 294 and 296. Transistor 292 includes bias resistors 298 and 300. Resistor 300 specifically biases the base so as to rapidly turn on the transistor 292.

The input to the base of the transistor 292 is coupled through a resistor 302 from the transistor 240. A resistor 304 controls the level of the current through the electrochemical storage member 286. When the signal at the terminal 224 is at a certain predetermined level, for example, a level representing 570° C., in the aircraft engine, transistor 240 is turned on, thereby providing a signal to the transistor 292. Transistor 292 is therefore turned rapidly on providing a constant current flow through the electrochemical storage member 286. As long as the input signal at the terminal 224 is above the predetermined value, a current will flow through the electrochemical storage member 286, providing for monitoring of information representing a temperature condition of a particular minimum value in the aircraft engine.

Electrochemical storage members 288 and 290 include similar structure. For example, resistors 306, 308, 310 and 312 in association with transistor 294 control a constant current through the electrochemical storage member 288 when the input signal at the terminal 224 normally has a value representing a temperature condition of 600° C. Electrochemical storage member 290 includes associated resistors 314, 316, 318 and 320 which control a constant current flow through the electrochemical storage member 290 in accordance with a level of signal at terminal 224 which represents a temperature condition of 640° C. in the aircraft engine.

The aircraft service computer of the present invention may also include a means to provide an output indication of a gross over-temperature. For example, the output of the transistor 296 may be coupled to a silicon-controlled rectifier 322. A capacitor 324 is used to prevent noise from the collector of the transistor 296 from tripping the silicon-controlled rectifier. The signal applied to the silicon-controlled rectifier is taken across a resistor 326 and a biasing resistor 328 provides a proper bias on the silicon-controlled rectifier 322. When the transistor 296 is turned on, thereby providing a current flow through the electrochemical storage member 290, the silicon-controlled rectifier 322 is also turned on.

A capacitor 330 is normally charged through the resistor 328. The capacitor 330 is also coupled through a visual alarm mechanism 332 to the source of minus potential. When the silicon-controlled rectifier 322 fires, it discharges the capacitor 330 through the visual alarm mechanism 332, thereby providing a visual indication. The visual indication may then be reset manually, using a reset mechanism 334. The visual alarm 332 is of a known type which when tripped remains in a latched position until manually reset. It is to be appreciated that the visual alarm mechanism 332, although controlled by a temperature condition in the engine equal to 640° C., may be coupled to other portions of the circuit so that the gross over-temperature may be chosen to have other values.

The present invention also includes an event counter and, in the example shown in FIGURE 4, the events which are counted correspond to the occurrence of a temperature condition of 600° C. It is to be appreciated that the events may be counted for all of the various temperature bands monitored by the electrochemical storage members 286, 288 and 290. In FIGURE 4, however, the output of the transistor 294 is coupled through a capacitor 336 to a diode 338 which in turn is coupled to the transistor 340. The diode 338 prevents the discharge of the capacitor from affecting the later operation of the event counter.

The event counter specifically includes an electrochemical storage member 342 which is coupled from the emitter of the transistor 340 through a resistor 344. A resistor 346 is coupled between the source of minus potential and the diode 338. Upon the reception of an input signal at the terminal 224 which represents a temperature condition of 600° C., the transistor 294 is ultimately turned on to provide an output signal which charges up the capacitor 336. As the capacitor 336 is being charged, it turns on the transistor 340 so as to provide for a constant current through the electrochemical storage member 342 for a period of time equal to the time the transistor 340 is turned on.

As soon as the capacitor 336 is completely charged, the voltage at the base of the transistor 340 goes down, thereby turning off the transistor 340 and stopping the flow of current through the electrochemical storage member 342. Therefore, the electrochemcal storage member 342 receives a particular current flow for a particular period of time in accordance with the charging of the capacitor 336, which charging rate is determined by the value of the capacitor 336 and of the resistor 348. The diode 338 as indicated above prevents the discharge of the capacitor when the transistor 294 is turned off from affecting the operation of the transistor 340 so that no additional current flow is provided through the electrochemical storage member 342. It may, therefore, be seen that each time the temperature exceeds 600° C., the electrochemical storage member 342 receives a charge of active material representing one event.

In all of the electrochemical storage members shown in FIGURE 4, a later readout may be accomplished by re-transferring the active material in the opposite direction to that shown in FIGURE 4. The retransfer of the active material may be timed so as to provide for an output indication of the various conditions monitored by the electrochemical storage members. These various conditions are the time-temperature operating characteristic, which gives the equivalent operating time for the aircraft engine as monitored by the electrochemical storage member 220, the elapsed engine operating time as monitored by the electrochemical storage member 216, the time exceeding particular temperature values for the aircraft engine as monitored by the electrochemical storage members 286, 288 and 290, and finally the event counting as monitored by the electrochemical storage member 342. Individually, these various storage members provide valuable information and a correlation of the information from the various electrochemical storage members provide additional information which is valuable to the maintenance of the aircraft engine.

The present invention, therefore, provides for an aircraft service computer which monitors the time-temperature operating characteristic of the aircraft engine in accordance with the temperature conditions of the aircraft engine. This time-temperature operating characteristic is used to provide an output signal, which output signal is coupled through an electrochemical storage member to accumulate information representing the time-temperature operation characteristic. This output signal may have its level shifted upward or downward in accordance with conditions such as altitude or cooling.

The time-temperature operating characteristic may be produced using a function generator so as to simulate with fixed straight line portions the non-linear curve which actually represents the time-temperature operating characteristic. Controlled by portions of the function generator may be additional electrochemical storage members which store information relating to the operating characteristics of the aircraft engine and specifically relating to the temperature characteristics at particular temperature levels. Although the invention has been described with reference to a particular embodiment, it is to be appreciated that various adaptations and modifications may be made and the invention is only to be limited by the appended claims.

I claim:

1. An aircraft service computer for monitoring the time-temperature operating characteristic of an aircraft engine in accordance with an input signal responsive to a temperature condition of the aircraft engine, including
    an electrochemical storage member including at least a pair of electrodes and including active material for transfer between the electrodes,
    first means responsive to the input signal for producing an output signal having characteristics in accordance with the time-temperature operating characteristic of the aircraft engine,
    second means coupling the output signal to the electrochemical storage member for transferring active material between the electrodes in accordance with the characteristics of the output signal, and
    third means coupled to the first means for varying the the level of the output signal in accordance with conditions which affect the sensitivity of the time-temperature operating characteristics of the aircraft engine.

2. The aircraft service computer of claim 1 wherein the first means includes a function generator which produces the output signal.

3. The aircraft service computer of claim 2 wherein the third means varies the level of the output signal by controlling the bias of the function generator.

4. An aircraft service computer for monitoring the time-temperature operating characteristic of an aircraft engine in accordance with an input signal responsive to a temperature condition of the aircraft engine, including
    an electrochemical storage member including at least a pair of electrodes ad including active material for transfer between the electrodes,
    first means responsive to predetermined levels of the input signal for producing an output signal having straight line portions with different slopes to simulate the time-temperature operating characteristic of the aircraft engine, and
    second means coupling the output signal to the electrochemical storage member for transferring active material between the electrodes in accordance with the characteristics of the output signal.

5. The aircraft service computer of claim 4 wherein each straight line portion has a different slope and wherein each straight line portion is produced in response to a different one of the predetermined levels of the input signal.

6. The aircraft service computer of claim 5 wherein the first means forms a function generator to produce the straight line portions and includes diode portions to respond to the predetermined levels.

7. An aircraft service computer for monitoring the operation of an aircraft engine and with the service computer responsive to an input signal having characteristics in accordance with a temperature condition of the aircraft engine, including a first electrochemical storage member including at least a pair of electrodes and including active material for transfer between the electrodes, a second electrochemical storage member including at least a pair of electrodes and including active material for transfer between the electrodes, first means responsive to a first particular value of the input signal representing a first temperature condition of the aircraft engine for providing a transfer of active material between the electrodes of the first electrochemical storage member, and second means responsive to a second particular value of the input signal representing a second temperature condition of the aircraft engine for providing a transfer of active material between the electrodes of the second electrochemical storage member.

8. The aircraft service computer of claim 7 additionally including a third electrochemical storage member and third means responsive to either the first or second particular values of the input signal for transferring a predetermined charge of active material within the third electrochemical storage member.

9. The aircraft service computer of claim 7 additionally including an alarm mechanism responsive to a gross over-temperature condition in the aircraft engine.

10. An aircraft service computer for monitoring the operation of an aircraft engine and with the service computer responsive to an input signal having characteristics in accordance with a temperature condition of the aircraft engine, including a first electrochemical storage member including at least a pair of electrodes and including active material for transfer between the electrodes, a second electrochemical storage member including at least a pair of electrodes and including active material for transfer between the electrodes, first means responsive to a first particular value of the input signal representing a first temperature condition of the aircraft engine for providing a transfer of a variable amount of active material between the electrodes of the first electrochemical storage member in accordance with the duration of the input signal, and second means responsive to the first particular value of the input signal representing the first temperature condition of the aircraft engine for providing a transfer of a particular amount of active material between the electrodes of the second electrochemical storage member regardless of the duration of the input signal.

11. The aircraft service computer of claim 10 including additional electrochemical storage members and means responsive to different values of the input signal for transferring active material within the additional electrochemical storage members in response to the different values of the input signal.

12. The aircraft service computer of claim 11 additionally including an alarm mechanism responsive to a particular value of the input signal representing a gross over-temperature condition for the aircraft engine.

13. An aircraft service computer for monitoring the operation of an aircraft engine and with the service computer responsive to an input signal having characteristics in accordance with a temperature condition of the aircraft engine, including a first electrochemical storage member including at least a pair of electrodes and including active material for transfer between the electrodes, a second electrochemical storage member including at least a pair of electrodes and including active material for transfer between the electrodes, a third electrochemical storage member including at least a pair of electrodes and including active material for transfer between the electrodes, first means responsive to a first particular value of the input signal representing a first temperature condition of the aircraft engine for providing a transfer of active material between the electrodes of the first electrochemical storage member, second means responsive to a second particular value of the input signal representing a second temperature condition of the aircraft engine for providing a transfer of active material between the electrodes of the second electrochemical storage member, and third means responsive to the first and second particular value of the input signal for providing a first signal having a first particular characteristic in response to the reception of the first particular value of the input signal to produce a transfer of active material between the electrodes of the third electrochemical cell and for providing a second signal having a second particular characteristic in response to the reception of the second particular value of the input signal to produce a transfer of active material between the electrodes of the third electrochemical cell.

14. The aircraft service computer of claim 13 wherein the first, second and third means form a function generator.

15. The aircraft service computer of claim 13 additionally including means for shifting the level of response of the first and second means to compensate for changes in the temperature sensitivity of the aircraft engine.

16. A service computer for monitoring the time-temperature characteristics of an engine in accordance with a temperature condition of the engine including a first storage member responsive to the flow of current through the member and having characteristics of indicating the time for such current flow, a second storage member responsive to the flow of current through the member and having characteristics of indicating the time for such current flow, first swtiching means having first and second operating states and responsive to a first particular temperature in the engine for producing a change in its operation from the first state to the second state, second switching means having first and second operating states and responsive to a second particular temperature in the engine for producing a change in its operation from the first state to the second state, first circuit means including the first storage member and the first swtiching means for providing for a flow of current through the first storage member upon the operation of the first switching means in the first state, and second circuit means including the second storage member and the second switching means for providing for a flow of current through the second storage member upon the operation of the second switching means in the second state.

17. The service computer set forth in claim 16 wherein a value for providing for the flow of current through the first circuit means includes a first impedance having the first storage member at a first rate during the time that the temperature of the engine is in a first range including the first temperature and the second circuit means includes a second impedance having a value for providing for the flow of current through the second storage member at a second rate during the time that the temperature of the engine is in a second range including the second temperature.

18. A service computer for monitoring the time-temperature operating characteristic on an engine in accordance with a temperature condition of the engine, including

13 a member responsive to the flow of current through the member and having characteristics of indicating the integral of the time and such current flow, a function generator responsive to the temperature condition of the engine for providing individual slope characteristics at different temperature bands of the aircraft engine, and means connecting the member and the function generator in an electrical circuit for producing a flow of current through the member at different levels in accordance with the individual characteristics of the function generator to obtain an indication by the member of the integral of the time and such current flow.

19. An aircraft service computer for monitoring the time-temperature operating characteristics of an aircraft engine in accordance with an input signal responsive to a temperature condition of the aircraft engine, including an electrochemical storage member including at least a pair of electrodes and including active material for transfer between the electrodes, first means responsive to the input signal for producing an output signal having characteristics in accordance with the time-temperature operating characteristics of the aircraft engine, and second means coupling the output signal to the electrochemical storage member for transferring active material between the electrodes in accordance with the characteristics of the output signal, and the first means including a function generator which produces the output signal by simulating the time-temperature operating characteristics with a plurality of straight line segments having different slopes.

20. An aircraft service computer for monitoring the time-temperature operating characteristics of an aircraft engine in accordance with an input signal responsive to a temperature condition of the aircraft engine, including an electrochemical storage member including at least a pair of electrodes and including active material for transfer between the electrodes, first means responsive to the input signal for producing an output signal having characteristics in accordance with the time-temperature operating characteristic of the aircraft engine, second means coupling the output signal to the elec-

14 trochemical storage member for transferring active material between the electrodes in accordance with the characteristics of the output signal, and the level of the output signal being varied in accordance with other parameters affecting the sensitivity of the aircraft engine to temperature.

21. An aircraft service computer for monitoring the operating characteristics of an aircraft engine in accordance with an input signal responsive to a temperature condition of the aircraft engine, including an electrochemical storage member including at least a pair of electrodes and including active material for transfer between the electrodes, first means responsive to the input signal for producing an output signal having characteristics in accordance with the temperature characteristics of the aircraft engine, second means coupling the output signal to the electrochemical storage member for transferring active material between the electrodes in accordance with the characteristics of the output signal, and electrochemical storage members for storing information regarding the time-temperature operating characteristic of the aircraft engine and regarding the temperature exposure of the aircraft engine within various temperature bands.

22. The aircraft service computer of claim 21 including a function generator for detecting different levels of the input signal representing different temperature levels in the aircraft engine to store information regarding the various temperature bands and to store information simulating the time-temperature operating conditions

References Cited

UNITED STATES PATENTS

| | | | |
|---|---|---|---|
| 3,237,448 | 3/1966 | Howell et al. | 73—117.2 X |
| 3,250,901 | 5/1966 | Brahm | 73—117.2 X |
| 3,357,239 | 12/1967 | Hohenberg | 73—116 |
| 3,362,217 | 1/1968 | Evans et al. | 73—116 |
| 3,395,402 | 7/1968 | Widrow et al. | 317—231 X |

JERRY W. MYRACLE, Primary Examiner

U.S. Cl. X.R.

235—183